May 19, 1970     J. SLOANE     3,513,063
ARTIFICIAL CHRISTMAS TREE CONSTRUCTION
Filed March 31, 1967     2 Sheets-Sheet 1
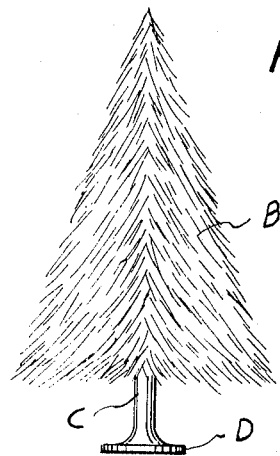
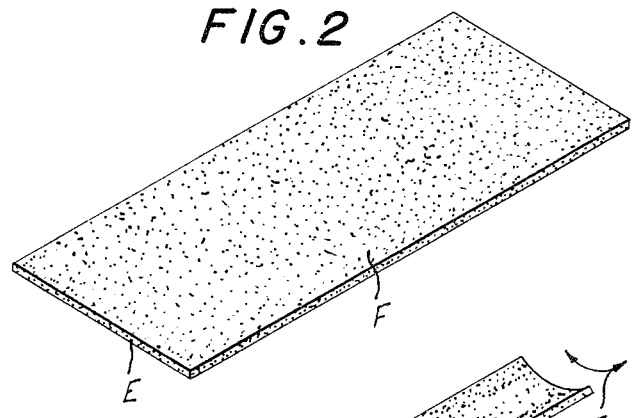
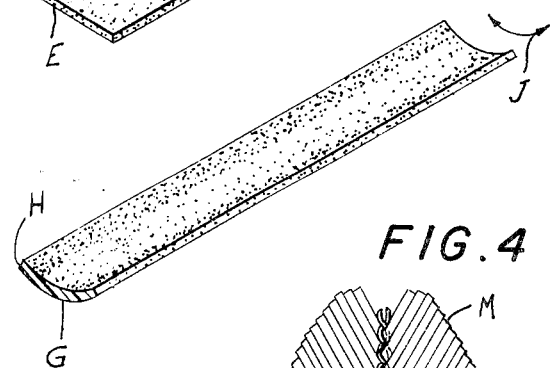
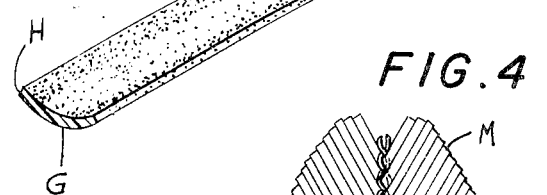
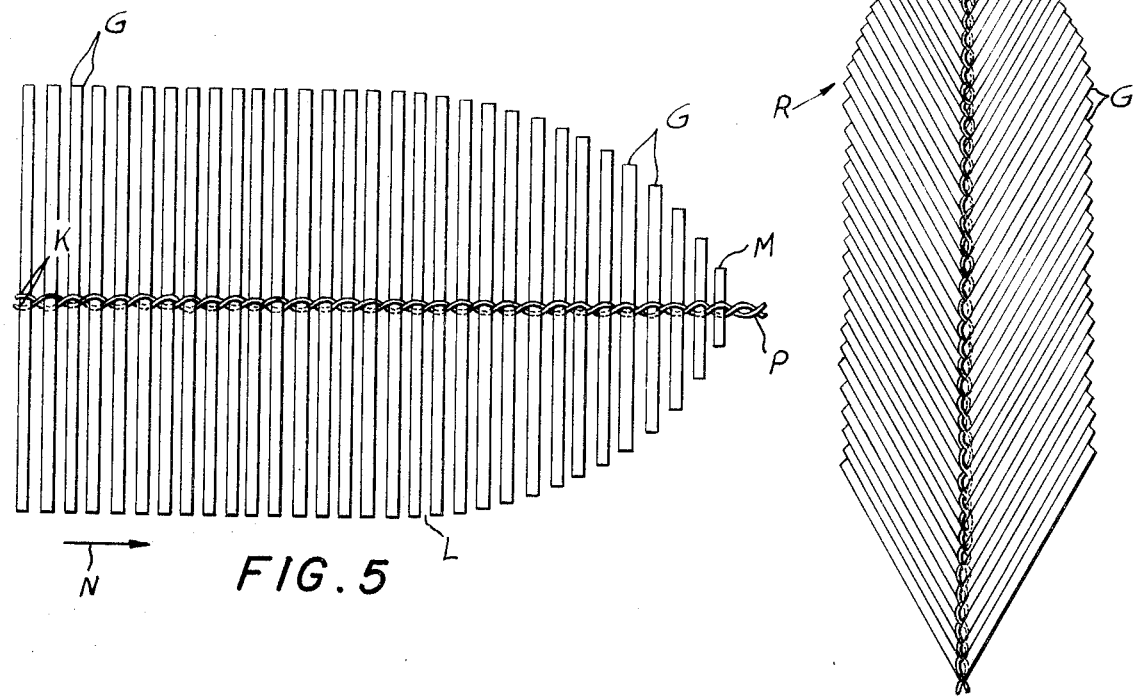
INVENTOR.
JACK SLOANE
BY
ATTORNEY May 19, 1970　　　　　J. SLOANE　　　　　3,513,063
ARTIFICIAL CHRISTMAS TREE CONSTRUCTION
Filed March 31, 1967　　　　　　　　　　　2 Sheets-Sheet 2
FIG.6
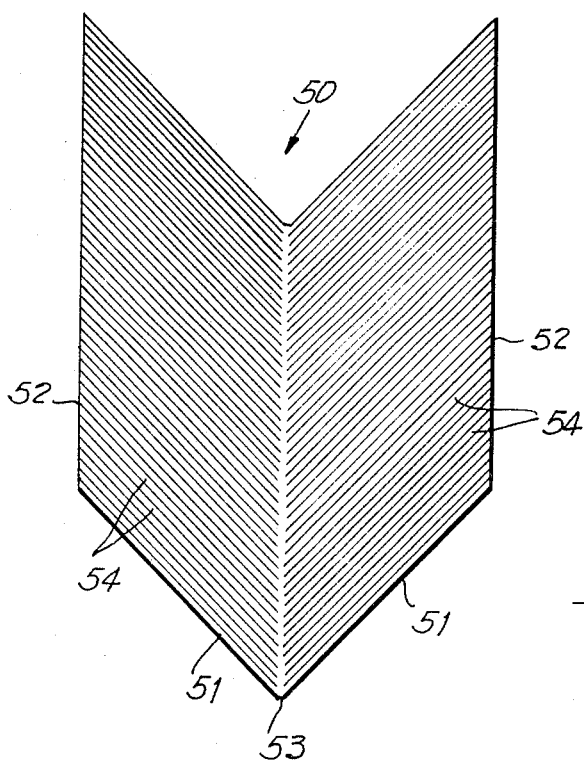
FIG.7
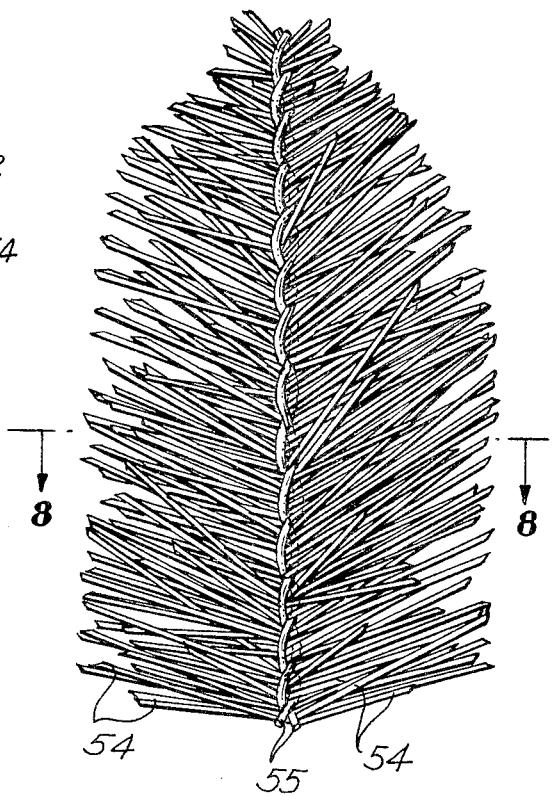
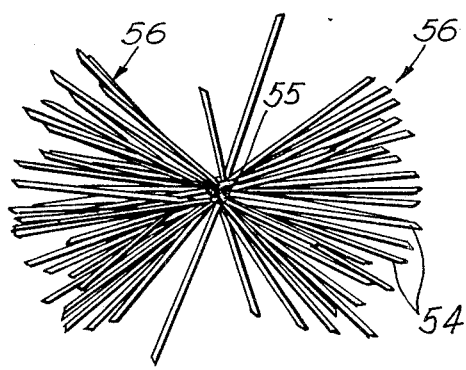
FIG.8
INVENTOR.
JACK SLOANE
BY
ATTORNEY

United States Patent Office 3,513,063
Patented May 19, 1970

3,513,063
ARTIFICIAL CHRISTMAS TREE CONSTRUCTION
Jack Sloane, Richmond Hill, N.Y.
(90—02 Atlantic Ave., Ozone Park, N.Y. 11416)
Filed Mar. 31, 1967, Ser. No. 627,356
Int. Cl. A47g 33/06
U.S. Cl. 161—22
8 Claims

ABSTRACT OF THE DISCLOSURE

The disclosure sets forth a novel artificial Christmas tree made of sheet plastic which has been imprinted by an engraved cylinder and/or by an intaglio process to give a mottled appearance, consisting of a combination of blue and green which realistically presents the color and surface effect of a blue spruce Christmas tree. The subject matter is designed for application after cutting and assembly to form a plurality of finely threaded leaf structures to be used as artificial Christmas trees, decorations, wreaths, sprays and garlands. The narrow strips of the cut imprinted plastic are assembled by means of twisted wires forming the stem with the leaf elements projecting obliquely upwardly and outwardly on each branch and with the ends of the stems or branches being cut off circularly. The resultant effect is exactly that of a natural blue spruce Christmas tree which may be in varying sizes from very small trees or other articles ranging from a few inches in height or width up to several feet.

CROSS REFERENCES TO RELATED APPLICATION

There are no related applications to which cross reference must be made.

BACKGROUND OF INVENTION

Field of the invention

This invention relates to the preparation of plastics for and the manufacture of artificial Christmas trees and other decorative Christmas or other holiday ornamentations from sheet plastic materials.

Descrition of prior art

Christmas trees and decorative objects made from sheet plastic materials usually do not give a natural appearance and the result of cutting the plastic and forming leaves gives a stiff, unsightly effect which detracts from the decorative functions for which these devices are designed.

In addition to the hand of the tree or decoration is undesirable and is too sharp and the various leaf formations do not appear to retain their relative shape in respect to one another and in respect to the central stem and, furthermore, are subject to changing atmospheric conditions, particularly varying temperature and humidity.

Furthermore, the ends of the stems or leaves give the effect of a ragged or shaggy outline, whereas natural branches have a smooth exterior and are not a dense or dead color such as is characteristic of opaque colored plastic sheetings.

SUMMARY OF THE INVENTION

It is among the objects of the present invention to provide a novel artificial Christmas tree or decorative spruce wreath and garland formed of simulated blue spruce plastic sheet materials which will have a natural appearance and a smooth finished outline and which will very closely approximate the appearance of a natural spruce tree or branches or garlands made therefrom.

Another object is to provide a simple, economical method of forming artificial Christmas trees or garlands or wreaths of blue spruce simulated plastic sheet materials which will be economical to manufacture, will be durable and have a desirable decorative appearance with a live color effect.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to provide a sheet plastic material desirably 5 to 20 mils in thickness of desirably .005 to .050 inch in thickness which will consist of an integrated dyed sheet material made of sheet cellulose acetate or cellulose butyrate or polyvinyl acetate and/or chloride copolymers and/or polyethylene or polypropylene. The basic inherent coloring material is desirably a very dark dense green. Applied to the surface is an adhesive pigmented coloring solution which will give spots or a mottled appearanace in blue coloration. Desirably, this may be achieved by intaglio printing or by rotogravure printing or may be achieved also by spraying a very fine mist of the blue coloration onto the surface of the sheet plastic material. The pigmented solution desirably contains a pigment dissolved in a solvent which will slightly penetrate the face of the sheet material and give a permanent adherence to the sheet material leaving a major portion of the green appearing through the superficial speckled or mottled appearance.

The sheet material itself should desirably have a content from 10% to 40% of a plasticiser such as methyl ethyl or butyl phthalate or sebacate or succinate.

The solution for giving the speckled or mottled blue-over appearance desirably contains 5% to 25% of the same plasticiser and 10% to 60% of a solvent of both the blue pigment as well as the base plastic in sheet material such as methyl ethyl ketone, and the balance should be either suspended or, more preferably, dissolved coloring which will blend with the green at the points of contact with the surface of the sheet. It is also possible to apply some finely divided powders or dispersions of finely divided bronze or aluminum to enhance the effect it is desired to achieve.

This sheet material is then desirably slit to form the spruce-like elements with the slittings having a width not exceeding $\frac{1}{32}$ or $\frac{1}{64}$ of an inch and desirably ranging from $\frac{1}{128}$ of an inch to $\frac{1}{16}$ of an inch with a mean variation of $\frac{1}{64}$ to $\frac{1}{32}$ of an inch.

It is then important in slitting the leaves to be assembled to form the branches, wreaths or other decorations, that the slit portion be given a curvature and smooth edge and this may be accomplished desirably by a cutting tool or cutting procedure which has heated blades and which will tend not only to avoid sharp edges but also to give a firm, form-holding shape to the cut, simulated leaf elements.

Desirably, the entire contour of the branches which are formed should be rounded and these branches are formed by thin twisted metal stems which will grasp the cut leaves midway of their length, with the leaves being turned upwardly and obliquely outwardly to the tip of the stem with sufficient heat being applied so that they will take a fixed confirmation and which will not lose its obliquity or parallelism which normally should be about 40° to 50° obliquely outwardly from the stem, uniform around the periphery of the stem.

The leaves are desirably cut off so as to give a rounded effect both along the end of the stem and along the run of the stem.

This type of formation not only will reproduce almost identically the appearance of a natural spruce wreath or tree or branch, but will also retain this shape without drooping and without the leaves becoming disarrayed. It will give a long lasting decorative appearance and avoid altogether the difficulty that the leaves or branches or trees tend to droop or change position, particularly when subjected to changing humidity or temperature.

The trees, wreaths and decorations, according to the present invention, are able to withstand dry, internally heated rooms, dwellings or offices and also may be put outside to be subject to weathering without loss of shape and form. A particularly desirable effect is that the leaves will hold their parallelism and shape over long periods of time and over varying temperatures and conditions.

The effect of the plasticiser and the mottled thin overcoat will permit the plastic slivers or strips which form the leaves to retain both their position and shape when they have been formed into the final leaf structure, branch or tree as the case may be. Furthermore, it has been found most desirable to make the stem of two twisted wires which are caused to engage the cut slivers or strips which form the leaves and which are then so twisted that the slivers will project in all directions and give a uniform circular effect around the stem of outwardly projecting slivers or leaves. This twisted stem will also hold the slivers or leaves in their oblique outwardly and obliquely projecting position.

Desirably the leaves should be held mechanically in this position and then subjected to dry or semi heat at a temperature of about 180° to 260° F. and desirably at about 220° to 230° F. to give them a final set which they will hold thereafter because of the overcoating and confirmation of the slivers.

BRIEF DESCRIPTION OF THE DRAWINGS

To attain these objects and such further objects as may appear herein or be hereinafter pointed out, I make reference to the accompanying drawings, forming a part hereof in which:

FIG. 1 is a side elevation of an artificial Christmas tree made according to the present invention.

FIG. 2 is a fragmentary perspective view showing part of a sheet of overprinted or overcoated plastic material from which the slivers or leaves of the spruce tree may be cut.

FIG. 3 is a fragmentary perspective view upon a large scale of one of the slivers, indicating the rounded corners and curved contour.

FIG. 4 is a fragmentary side elevational view of one of the branches, showing the leaves or slivers in position with a central stem and a rounded contour, as they may be assembled to form wreaths or trees, as indicated in FIG. 1.

FIG. 5 is a fragmentary plan view indicating the manner of assembly of the slivers with the stem wires to form the assembly unit of FIG. 4.

FIG. 6 is a plan view indicating how one or more elongated sheets of plastic material may be cut to give the needle-like leaves of the spruce or other coniferous tree of the present invention.

FIG. 7 is a side elevational view indicating how a plurality of these sheets may be assembled with a central twisted wire or other elongated support to form a simulated branch.

FIG. 8 is a transverse sectional view upon the line 8—8 of FIG. 7.

DESCRIPTION OF THE PREFERRED EMBODIMENTS

FIG. 1 shows an artificial Christmas tree A, having foliage B consisting of a plurality of branches forming a conical shape. The trunk C has a stand D. The leaf structure is formed of thin plastic sheets E as shown in FIG. 2 which may be extruded, rolled or cast of a thermo plastic flexible polymer such as polyethylene or polyvinyl-acetate copolymers, the latter containing 20% to 50% of a plasticizer such as dioctyl phthalate or succinate, together with a suitable anti oxidant.

The polyethylene when used may contain a suitable amount of butadiene polymers. Desirably the sheet E, after formation, is roller coated on both sides or, more preferably, intaglio printed on both sides, with a contrasting colored varnish or printing paste, having the same plastic base as the material of the sheet. For example, with a vinyl sheet the applique or overcoat may contain a vinyl copolymer, together with a volatile solvent and a smaller amount of plasticisers, for example, 20% to 30%, than the base sheet E.

Desirably, the overprinting results in a mottled or speckled effect where the base color sheet E will have a deep integrated dark green color, while the surfacing or overcoat F will have a speckled or mottled blue color.

These sheets then are sliced with knives under such temperature and conditions as to result in a series of slivers which will form the leaves of the spruce tree having the contours of FIG. 3.

The contour of FIG. 3 shows a curved or semi-cylindrical-like sliver G with rounded edges H which will retain its shape when fixed by suitable heat treatment. The edges H are devoid of sharp corners and this may be accomplished by application of heat during the slicing operation or by treating the edges with heat afterwards to cause incipient fusion. At the same time, by placing the sheet E under tension while slicing, the cylindrical shape G will be achieved. This may also be achieved by providing a bed or base for the sheet E or stack of sheets E when slicing which will cause them to assume a rounded shape when cut. This is most desirably accomplished by means of tensioning the plastic sheet in the direction indicated at J in FIG. 3.

The leaves are desirably cut off so as to give a rounded effect both along the end of the stem and along the run of the stem.

This type of formation not only will reproduce almost identically the appearance of a natural spruce wreath or tree or branch, but will also retain this shape without drooping and without the leaves becoming disarrayed. It will give a long lasting decorative appearance and avoid altogether the difficulty that the leaves or branches or trees tend to droop or change position, particularly when subjected to changing humidity or temperature.

The trees, wreaths and decorations, according to the present invention, are able to withstand dry, internally heated rooms, dwellings or offices and also may be put outside to be subject to weathering without loss of shape and form. A particularly desirable effect is that the leaves will hold their parallelism and shape over long periods of time and over varying temperatures and conditions.

The effect of the plasticiser and the mottled thin overcoat will permit the plastic slivers or strips which form the leaves to retain both their position and shape when they have been formed into the final leaf structure, branch or tree as the case may be. Furthermore, it has been found most desirable to make the stem of two twisted wires which are caused to engage the cut slivers or strips which form the leaves and which are then so twisted that the slivers will project in all directions and give a uniform circular effect around the stem of outwardly projecting slivers or leaves. This twisted stem will also hold the slivers or leaves in their obliquely outwardly projecting position.

Desirably the leaves should be held mechanically in this position and then subjected to dry or semi heat at a temperature of about 180° to 260° F. and desirably at about 220° to 230° F. to give them a final set which they will hold thereafter because of the overcoating and confirmation of the slivers.

In assembling, the slivers or leaves are laid between two core wires K and they are then cut as indicated by the lines L to the desired shape and size with a rounded end portion M. Then the core wires are twisted together to get a 360° spread of the slivers or leaves G. These slivers are then pressed upwardly in the direction N to an angle of between 55° to 35°, and desirably 45°, to the core wires K. At the same time a fixing heat or steaming is applied which will fix the position of the slivers so that they will take a permanent set.

The result is the finished branch shown in FIG. 4 with the end wire P being cut off. These branches which are indicated at R may be assembled into a tree, wreath or other object. With their blue mottled appearance and rounded ends they closely approximate to a normal, blue spruce tree and will hold their shape, being substantially permanent and withstanding weathering and internal dry heat or outdoor temperatures. Even when placed near an internal radiator they will not be subject to distortion, drooping or loss of shape and contour. The rounded effect of the slivers or leaves, as shown in FIG. 3, together with the mottled overcoat will give a natural appearance to the tree and will avoid the artificiality of plastic imitations. The structure may carry appurtenances such as electric lights, tinsel or Christmas balls without distortion or loss of shape.

Instead of cutting the leaves into separate slivers it is also possible to cut the strip so that the opposite sides are in slivers on a central portion uncut, along which the wires may be coiled.

In the embodiment of FIGS. 6–8 the strip of previously coated or decorated mottled plastic material, preferably polyvinyl sheet material, as indicated at 50, is slit at 51 along the oblique lines extending to the outer edges 52 leaving a central portion 53 unslit so as to hold the needle-like leaves together. This central portion may be of extra thickness, if desired, so as to form a firmer support and, in any case, it is desirably compressed so that it will have a higher density than the portion of the sheet material which forms the needle-like leaves 54. The slitting may be such as to incline the leaves away from the central stem 53 with slight obliquity of between 1 to 5° and the width of the central stem should be between one and two times the width of the single slit needle-like leaves.

The central stem should have a thickness varying between one to two times the thickness of the leaves and these should join the stem at an angle of between 30 to 60°, desirably at about 45°, so that the ends of the leaves will not become readily detached.

Then two, three or even six or seven, of the slit leaf members, as indicated in FIG. 6, are gathered together and then twisted so as to form a more or less circular object, as indicated in FIG. 7. These leaves 54, will be forced apart but their central structure will be held by the twisted wire or cord or other plastic element 55. Desirably, the effect of two or four cords or wires, as shown at 55 in FIGS. 7 and 8, is to give a bunching as indicated at 56 on each side of the central spine or axis 55 which encloses the vein 53 and this will give a most desirable effect closely approaching the effect of a Christmas tree spruce. The resultant effect most closely gives the impression that the tree structure or branch structure is that of a small spruce and the effect is long lasting and has a most desirable effect upon the eye.

Having now particularly described and ascertained the nature of the invention, and in what manner the same is to be performed, what is claimed is:

1. An artificial Christmas tree branch construction consisting of an elongated longitudinal group formed of a plurality of parallel thin preformed and premolded plastic strips cut from a plastic sheet formed of a thermoplastic flexible polymer selected from a group consisting of polyethylene and polyvinyl-acetate polymers containing a plasticizer, said strips having an arcuate cross-section and rounded side and top edges and having a deep integrated dark green coloring and having an intaglio overprinting of a blue colored varnish to give a mottled and speckled effect, said strips being centrally and longitudinally joined along a longitudinal axis and being inclined toward an upper and outer end, said branch construction being twisted around said longitudinal axis so that said strips will project upwardly and outwardly and in close proximity to one another along the length of the longitudinal branch around a substantially 360° periphery.

2. The branch of claim 1, said preformed and premolded plastic strips having an arcuate cross-section.

3. The branch of claim 1, said strips being centrally gathered by an unslit portion of the plastic sheet.

4. The branch of claim 1, said strips being of 5 to 20 mils in thickness.

5. The branch of claim 1, said strips having a width of between 1/64 and 1/16 of an inch and their inclination to the central longitudinal axis being about 40 to 50° and being parallel to each other.

6. The branch of claim 1, said strips having been preformed and pre-set in their inclined position and arcuate cross-section by a fixing heat of 180° to 260° F.

7. The branch of claim 1, said flexible sheet containing 20 to 50% of a plasticizer and said varnish overprint containing 5 to 25% of a plasticizer.

8. The branch of claim 1, the central longitudinal axis portion of the plastic sheet having a thickness and compression along the central longitudinal axis greater than the plastic strips so as to give increased strength.

References Cited

UNITED STATES PATENTS 3,343,357   9/1967   Goodridge _____ 161—30 XR

JACOB H. STEINBERG, Primary Examiner

U.S. Cl. X.R.

161—30